United States Patent [19]

Müller

[11] Patent Number: 4,609,341
[45] Date of Patent: Sep. 2, 1986

[54] HOT-RUNNER TOOL FOR SUPPLYING MOLTEN PLASTIC TO AN INJECTION MOLD

[75] Inventor: Walter Müller, Battenberg, Fed. Rep. of Germany

[73] Assignee: Ewikon Entwicklung und Konstruktion GmbH & Co KG, Herford, Fed. Rep. of Germany

[21] Appl. No.: 653,991

[22] Filed: Sep. 24, 1984

[30] Foreign Application Priority Data

Sep. 29, 1983 [DE] Fed. Rep. of Germany ....... 3335291

[51] Int. Cl.$^4$ ................ B29C 33/02; B29C 33/38
[52] U.S. Cl. .................................... 425/547; 264/269; 264/328.8; 264/328.14; 425/548; 425/549
[58] Field of Search ............ 264/328.1, 328.8, 328.14, 264/269, 273; 425/542, 547, 548, 549, 573

[56] References Cited

U.S. PATENT DOCUMENTS

| | | | |
|---|---|---|---|
| 4,340,156 | 7/1982 | Müller | 425/549 |
| 4,501,549 | 2/1985 | Abramov et al. | 425/542 |
| 4,505,661 | 3/1985 | Bielfeldt | 425/542 |

*Primary Examiner*—Jay H. Woo
*Assistant Examiner*—Timothy W. Heitbrink

[57] ABSTRACT

A hot-runner tool with at least one hot-runner section for supplying molten plastic to an injection mold, preferably a multiple injection mold with a pin-point gate for each casting. The hot-runner section has an outer housing with a flow channel, at least one inlet, and at least one outlet and a heat conductor that can be connected to an electric voltage and that the molten plastic flows around. The flow channel in the hot-runner section is demarcated externally by at least one metal tube that is separated from the heat conductor and a layer of heat insulation is positioned between the metal tube and the inner surface of the outer housing. The metal tube can store and conduct a lot of heat and helps to heat up the plastic rapidly. Since the tube supplies additional heat to those points along the hot-runner section where the plastic needs more heat than at other points, the tube homogenizes the molten plastic along the total length of the hot-runner section.

4 Claims, 3 Drawing Figures

HOT-RUNNER TOOL FOR SUPPLYING MOLTEN PLASTIC TO AN INJECTION MOLD

BACKGROUND OF THE INVENTION

The present invention relates to a hot-runner tool with at least one hot-runner section for supplying molten plastic to a injection mold, preferably a multiple injection mold with a pin-point gate for each casting, whereby the hot-runner section has an outer housing with a flow channel, at least one inlet, and at least one outlet and a heat conductor that can be connected to an electric voltage and that the molten plastic flows around.

A hot-runner tool of this type is known from German OS No. 2 938 832. The flow channel in the hot-runner section is demarcated externally by the inner surfaces of the outer housing and internally by a heat conductor. Since the molten plastic flowing into the flow channel is heated from the central heat conductor, it is especially the zone in the vicinity of the conductor that is heated most intensively. A layer of solidified plastic builds up on the inner surface of the outer housing, forming a layer of heat insulation and preventing the heat from flowing through the housing.

Since the molten plastic inside the flow channel partly or completely solidifies there during downtimes, the heat conductor must re-heat the total volume of plastic when operation is resumed. The plastic, however, is a poor heat conductor. An annular molten zone forms in the vicinity of the heat conductor and its thickness depends on the amount of electric power supplied to the conductor. Since the layers of plastic that are farther away from the heat conductor take a long time to heat up, heating times are long.

SUMMARY OF THE INVENTION

The object of the present invention is to provide a hot-runner tool of the aforesaid type in which the plastic that has partly or completely solidified in the flow channel of the hot-runner section as the result of downtime can be rapidly re-heated.

This object is attained in accordance with the invention in that the flow channel in the hot-runner section is demarcated externally by at least one metal tube that is separated from the heat conductor and a layer of heat insulation is positioned between the metal tube and the inner surface of the outer housing.

The layer of heat insulation can be an air gap between the metal tube and the inner surface of the outer housing. It can also consist of metal or of another heat-insulating material.

The metal tube that demarcates the flow channel externally is electrically neutral. It can essentially conduct and store more heat than the plastic. These properties allow the tube to briefly store heat from the molten plastic in the flow channel and to return it to the plastic when necessary. The tube, however, also helps homogenize the molten plastic over the length of the heat conductor because the presence of the plastic at various points along the hot-runner section also leads to variable conditions.

Since the heat insulation between the metal tube and the outer housing of the hot-runner section reduces the amount of heat that escapes, less electric power will have to be supplied to the heat conductor than in the known tool.

Instead of one metal tube that surrounds the heat conductor with a predetermined gap between them, several metal tubes one inside another can be provided, with slight gaps between them also providing heat insulation.

The tubes do not need to be round but can also have other cross-section shapes.

It is also possible to increase the area of the metal tube by providing it with ribs projecting into the flow channel.

The type of hot-runner section employed in accordance with the invention will lead to especially satisfactory results if the mass of the metal tube is appropriate for it to retain as much heat ±20% during operation as the plastic in the flow channel.

Some preferred embodiments of the invention will now be described with reference to the attached drawings, wherein

DETAILED DESCRIPTION OF THE PREFERRED EMBODIMENTS

Figure 1:
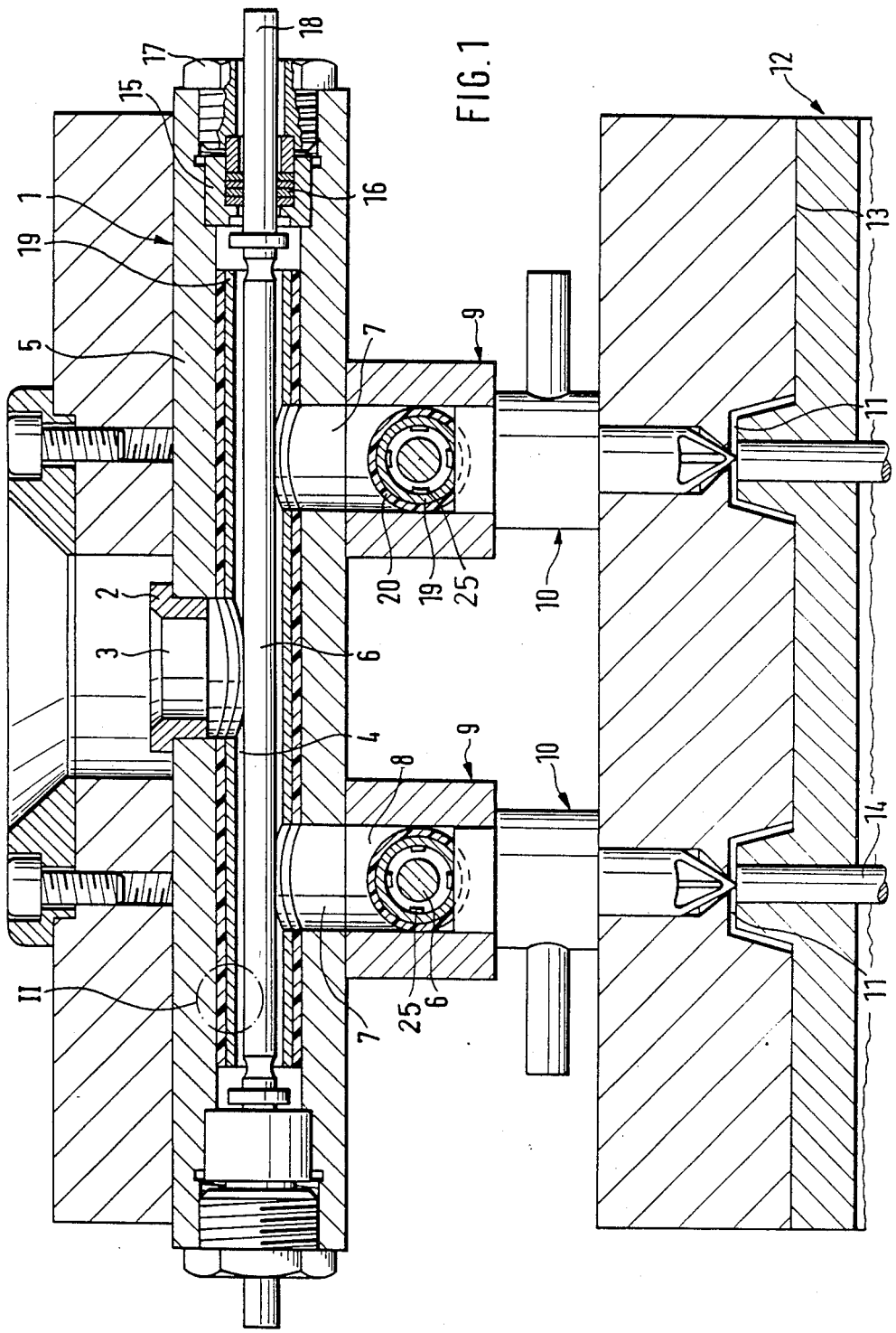
FIG. 1 is a vertical section through a hot-runner tool in association with an injection mold.
Figure 2:
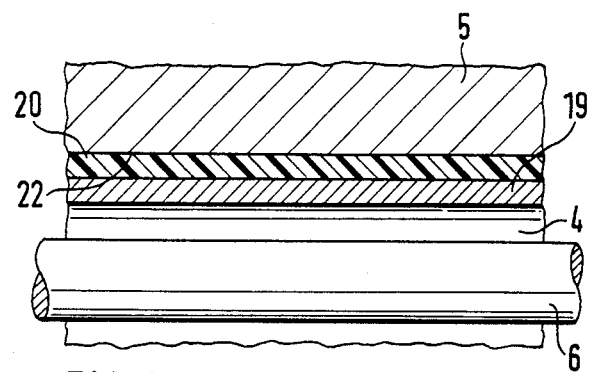
FIG. 2 is a detail of the area II in FIG. 1.

The hot-runner tool illustrated in FIGS. 1 and 2 has a hot-runner section 1 with a feed bush 2 that the nozzle of a plastic extruder is inserted in. Feed bush 2 thus constitutes an inlet 3 for the molten plastic that is to be introduced into a flow channel 4 in hot-runner section 1. Hot-runner section 1 has an outer housing 5. There is an electric heat conductor 6 in the flow channel of housing 5. The molten plastic flows around heat conductor 6, which demarcates the inside of the flow channel.

The molten plastic in the illustrated embodiment enters the flow channels 8 of further hot-runner sections 9 through outlets 7. Sections 9 are provided with extrusion dies 10. The plastic flows through extrusion dies 10 into the mold nests 11 of a injection mold 12. An electrical heat conductor 6 also passes through the center of each hot-runner section 9.

Injection mold 12 is opened to demold the solidified castings in a plane 13, with the castings being ejected from the mold nests by an ejector 14.

Electric heat conductor 6 is mounted in an insulating body 15 at the end of housing 5. The end of the conductor is sealed off from flow channel 4 with a gland 16 and a compression screw 17. Each end of the conductor is provided with a bushing 18 that the plug of a power-supply cable is inserted into.

As will be evident from FIG. 1, the ends of the heat conductor project out of outer housing 5.

Flow channel 4 is externally demarcated by a metal tube 19. There is a layer 20 of heat insulation between metal tube 19 and the inner surface 22 of outer housing 5. The layer of insulation is plastic in the illustrated embodiment. Metal tube 19 can also have inwardly projecting ribs 25.

Figure 3:
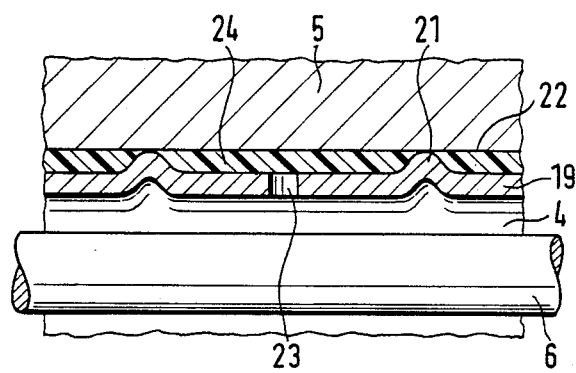
FIG. 3 is a variation of the embodiment illustrated in FIG. 2.

As shown in FIG. 3, metal tube 19 can be provided with ridges 21 to generate a layer of plastic. Ridges 21 project outward and rest against the inner surface 22 of outer housing 5. There are perforations 23 in the surface of the tube between ridges 21. When the hot-runner tool is operated for the first time, molten plastic penetrates through perforations 23 out of flow channel 4 into the space 24 between metal tube 19 and the inner surface 22 of outer housing 5 and solidifies there.

It will be appreciated that the instant specification and claims are set forth by way of illustration and not limitation, and that various modifications and changes may be made without departing from the spirit and scope of the present invention.

What is claimed is:

1. In a hot-runner tool with at least one hot-runner section for supplying molten plastic to an injection mold, wherein the hot-runner section has an outer housing with a flow channel, at least one inlet, at least one outlet and a heat conductor in the housing connectable to an electric voltage and around which the molten plastic flows, the improvement wherein the hot-runner section further comprises at least one metal tube separated from the heat conductor and electrically neutral with respect to the heat conductor and externally demarcating the flow channel and a layer of heat insulation positioned between the metal tube and the inner surface of the outer housing, and wherein the metal tube has ridges that project outward and rest against the inner surface of the outer housing and perforations in the surface of the tube between the ridges for receiving molten plastic that flows in between the metal tube and the inner surface of the outer housing and solidifies there to form a layer of heat insulation, whereby the escape of heat stored in the metal tube from the molten plastic is reduced.

2. The hot-runner tool as in claim 1, wherein the metal tube surrounds the heat conductor concentrically.

3. The hot-runner tool as in claim 1, wherein the metal tube has ribs that project inward in the flow channel.

4. The hot-runner tool as in claim 1, wherein the mass of the metal tube retains as much heat ±20% during operation as the plastic in the flow channel.

* * * * *